(12) United States Patent
Poorman et al.

(10) Patent No.: US 8,724,247 B2
(45) Date of Patent: May 13, 2014

(54) ADJUSTING A TRANSDUCER HEAD FOR TRANSFERRING DATA

(75) Inventors: Paul Poorman, Meridian, ID (US);
Mike Alan Holmberg, Eryle, ID (US);
Robert G. Walmsley, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 195 days.

(21) Appl. No.: 13/260,189

(22) PCT Filed: Oct. 5, 2009

(86) PCT No.: PCT/US2009/059546
§ 371 (c)(1),
(2), (4) Date: Sep. 23, 2011

(87) PCT Pub. No.: WO2011/043765
PCT Pub. Date: Apr. 14, 2011

(65) Prior Publication Data
US 2012/0019956 A1      Jan. 26, 2012

(51) Int. Cl.
*G11B 21/02* (2006.01)
*G11B 21/24* (2006.01)

(52) U.S. Cl.
USPC .............................................. 360/75; 360/291

(58) Field of Classification Search
None
See application file for complete search history.

(56) References Cited

U.S. PATENT DOCUMENTS

| | | | | |
|---|---|---|---|---|
| 4,258,398 A | * | 3/1981 | Bixby et al. | 360/76 |
| 4,497,005 A | * | 1/1985 | Heinz | 360/291.6 |
| 5,450,262 A | * | 9/1995 | Koster et al. | 360/241 |
| 5,500,777 A | | 3/1996 | Hasegawa et al. | |
| 5,646,803 A | * | 7/1997 | Kawabata et al. | 360/291.6 |
| 6,137,659 A | | 10/2000 | Warmenhoven | |
| 6,222,698 B1 | * | 4/2001 | Barndt et al. | 360/76 |
| 6,275,350 B1 | * | 8/2001 | Barndt | 360/77.12 |
| 6,469,860 B1 | * | 10/2002 | Hedding et al. | 360/75 |
| 6,661,596 B2 | | 12/2003 | Chliwnyj et al. | |
| 6,822,820 B1 | | 11/2004 | Winarski et al. | |
| 7,586,710 B2 | | 9/2009 | Partee et al. | |
| 7,859,786 B2 | * | 12/2010 | Saliba | 360/71 |
| 2005/0036227 A1 | * | 2/2005 | Hoerger | 360/63 |
| 2005/0052778 A1 | * | 3/2005 | Bui et al. | 360/77.12 |
| 2005/0270687 A1 | | 12/2005 | Zweighaft | |
| 2006/0050428 A1 | * | 3/2006 | Brittenham | 360/75 |
| 2007/0091499 A1 | * | 4/2007 | Saliba | 360/71 |
| 2007/0285831 A1 | | 12/2007 | Goker et al. | |
| 2008/0198506 A1 | | 8/2008 | Weng et al. | |
| 2009/0027803 A1 | | 1/2009 | Biskeborn et al. | |

OTHER PUBLICATIONS

International Search Report and Written Opinion, dated Jun. 23, 2010, 14 pates.

* cited by examiner

*Primary Examiner* — Thang Tran (57) ABSTRACT

A transducer head apparatus (140) is disclosed for concurrently transferring data relative to a plurality of tracks on a data carrier. The head apparatus comprises a body (310) extending longitudinally, the body supporting a plurality of longitudinally spaced transducer elements (240, 241, 242, 250, 251, 252, 260, 261, 255, 256, 257, 265, 266, 267), and adjuster apparatus (330) operable to adjust the relative longitudinal dispositions of at least some of the transducer elements.

20 Claims, 7 Drawing Sheets

ADJUSTING A TRANSDUCER HEAD FOR TRANSFERRING DATA

TECHNICAL FIELD

The invention relates generally to the field of transferring data in a plurality of tracks.

BACKGROUND

Data transfer devices, or storage devices, are known that comprise a transducer head to transfer data between the device and tracks on a data carrier, for storing data on the data carrier, which may be removably received in the device. However, such data carriers can be susceptible to dimensional instability under varying operating conditions, for example varying temperature and humidity. Such dimensional instability can affect head/track alignment.

SUMMARY

In accordance with one aspect of the invention, there is provided transducer head apparatus as claimed in claim 1.

In accordance with another aspect of the invention, there is provided tape drive apparatus as claimed in claim 14.

In accordance with still another aspect of the invention, there is provided a method as claimed in claim 15.

BRIEF DESCRIPTION OF THE DRAWINGS

In order that the invention may be well understood, various embodiments thereof will now be described, by way of example only, with reference to the accompanying drawings, in which.

DETAILED DESCRIPTION

Figure 1:
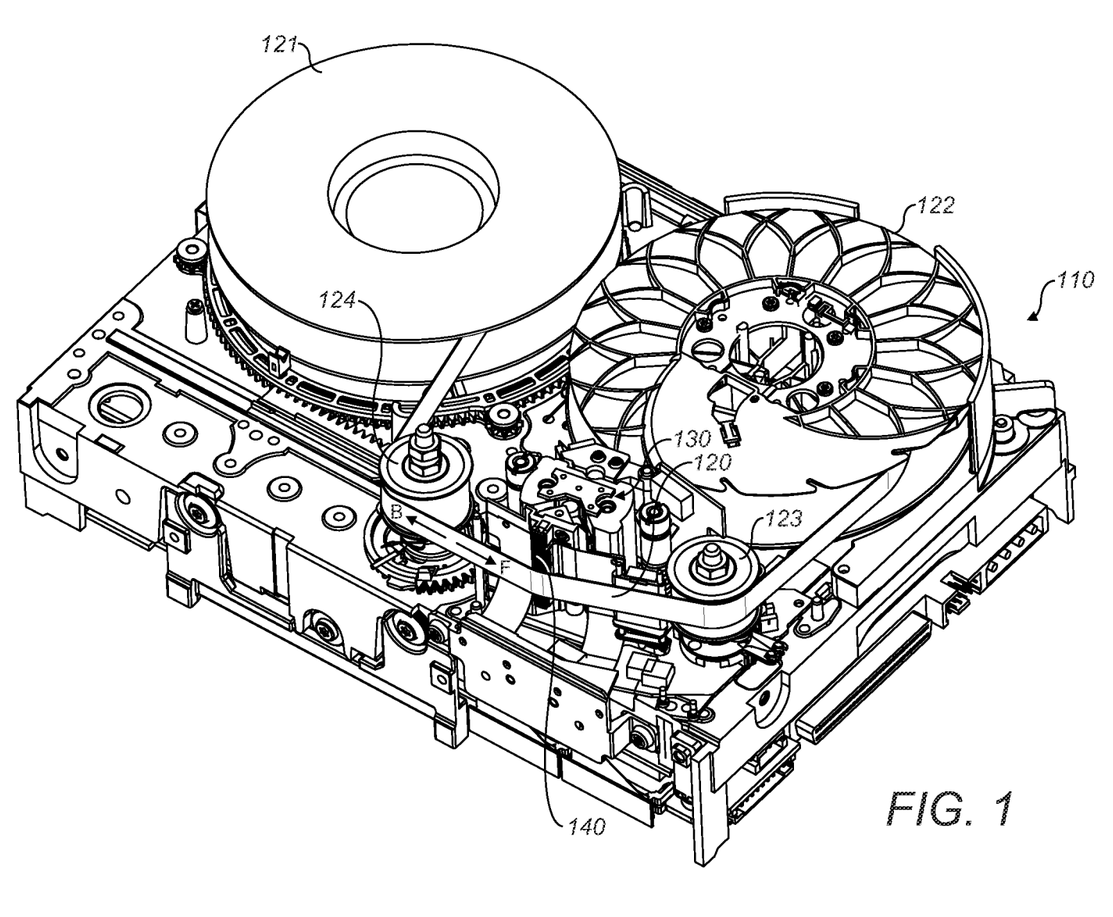
FIG. 1 is a perspective view of selected portions of a data transfer device in the form of a tape drive comprising transducer head apparatus.
Figure 2:
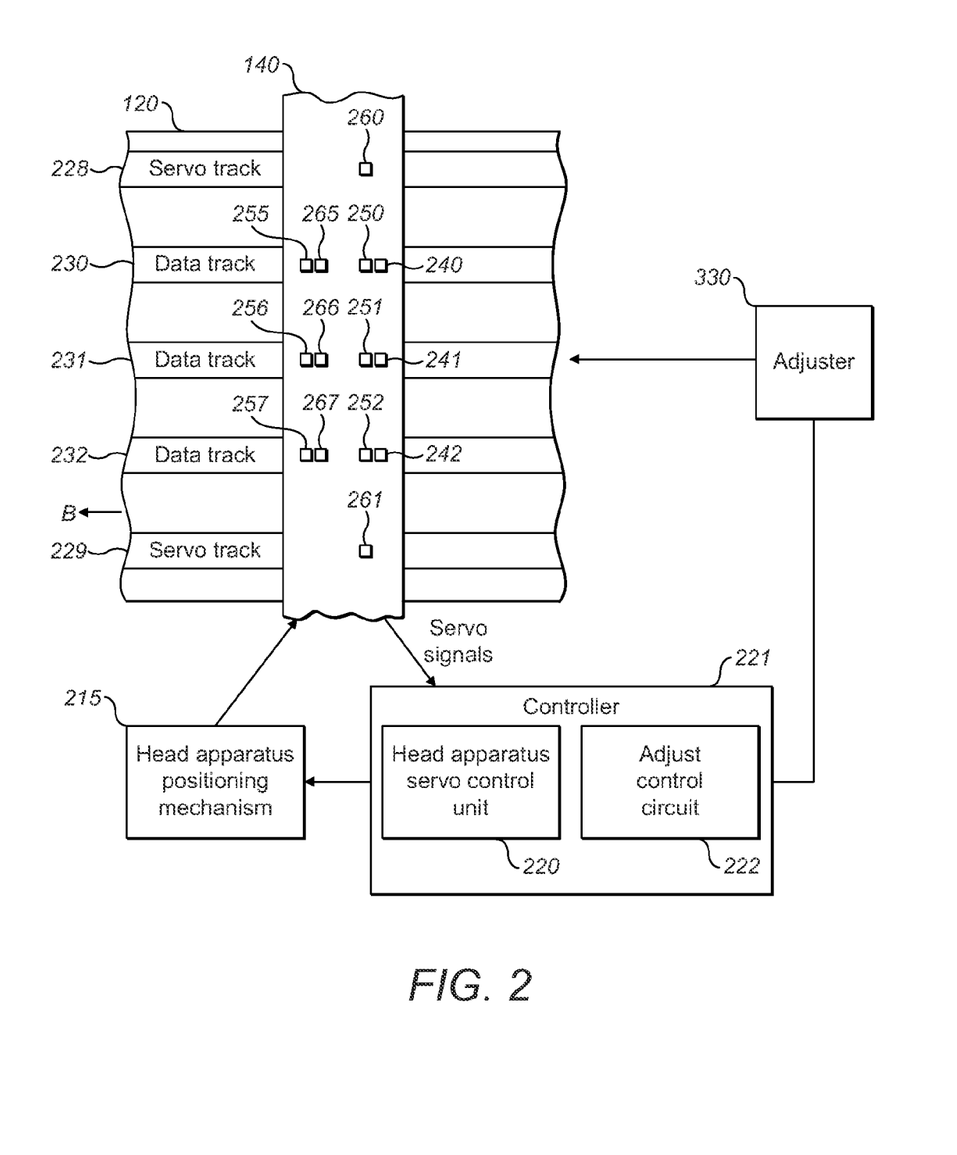
FIG. 2 is a schematic diagram showing a portion of a tape data carrier received in the device of FIG. 1, and a controller and mechanism for positioning the transducer head apparatus.

Referring to FIGS. 1 and 2, a data transfer device in the form of a tape drive 110 is operable to removably receive cartridge including a data carrier, or media, in the form of a magnetic tape 120. The tape 120 is driveable in opposite directions F, B along its length by two driven reels 121, 122 over guides 123, 124 so as to pass in proximity to transducer head apparatus 140 of a transducer head assembly shown generally as 130. The transducer head apparatus 140 is movable relative to the tape 120 (up and down as shown in FIGS. 1 and 2) by a head apparatus positioning mechanism 215 including an actuator such as a voice coil motor. The positioning mechanism 215 is controllable by a servo control circuit 220 of a tape drive controller 221. The servo control circuit 220 uses information read by servo transducer elements 260, 261 from servo tracks 228, 229 to position the transducer head apparatus 140 relative to data tracks 230, 231, 232 arranged in parallel along the tape 120.

Figure 3:
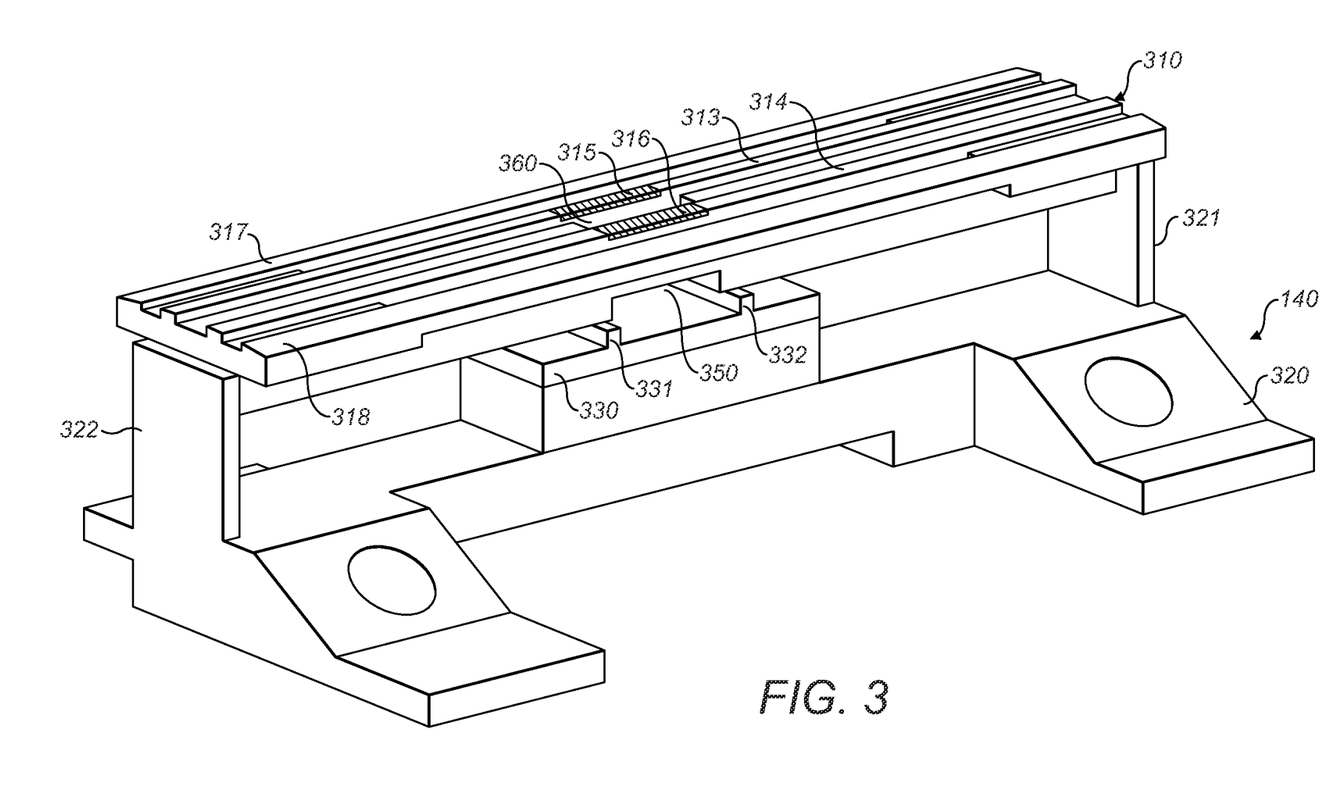
FIG. 3 shows the transducer head apparatus of FIG. 1 in greater detail.

The transducer head apparatus 140 is shown in greater detail in FIG. 3. The transducer head apparatus 140 comprises a head body 310 and a support 320, the body 310 being mounted to the support 320 by respective mounts 321, 322. Conveniently, the mounts 321, 322 are disposed at opposite longitudinal end portions of the body 310, so as to provide a space between the support 320 and a rear surface (not shown) of the body 310. The transducer head apparatus 140 further includes adjuster apparatus comprising an actuator 330 disposed between the support 320 and the head body 310 in the space between the support 320 and the rear surface of the body 310.

A front side of the body 310 includes two forwardly protruding longitudinally extending rails 313, 314, each rail supporting a respective array 315, 316 of transducer elements, the arrays 315, 316 also extending longitudinally of the body 310. The rails 313, 314 physically interface with the tape 120 as the head apparatus 140 and tape 120 move relative to one another in use, enabling the transducer element arrays 315, 316 to be presented to the data carrying face of the tape 120. Further, laterally outer, rails 317, 318 can be provided, for example to facilitate stable dynamic behaviour of the tape 120 as the tape 120 passes over the front face of the transducer head apparatus 140 at speed.

Transducer element array 315 comprises transducer elements, for example in the form of write elements 240, 241, 242, read elements 250, 251, 252 and servo elements 260, 261, and transducer element array 316 comprises transducer elements, for example in the form of write elements 255, 256, 257 and read elements 265, 266, 267, as shown in FIG. 2. In one implementation, the read elements and servo elements comprise magnetically sensitive thin-film magnetoresistive elements, and the write elements comprise thin-film inductive elements. While FIG. 2, for purposes of illustration, shows only three sets of read/write elements per array, in alternative embodiments the arrays 315, 316 include many more transducer elements, for example, sixteen read and/or write elements plus two servo elements per array for sixteen data track tape storage technology, or 32 read and/or write elements plus two servo elements per array for 32 data track tape storage technology. In alternative embodiments, any convenient alternative number and/or arrangement of arrays can be used.

Figure 4:
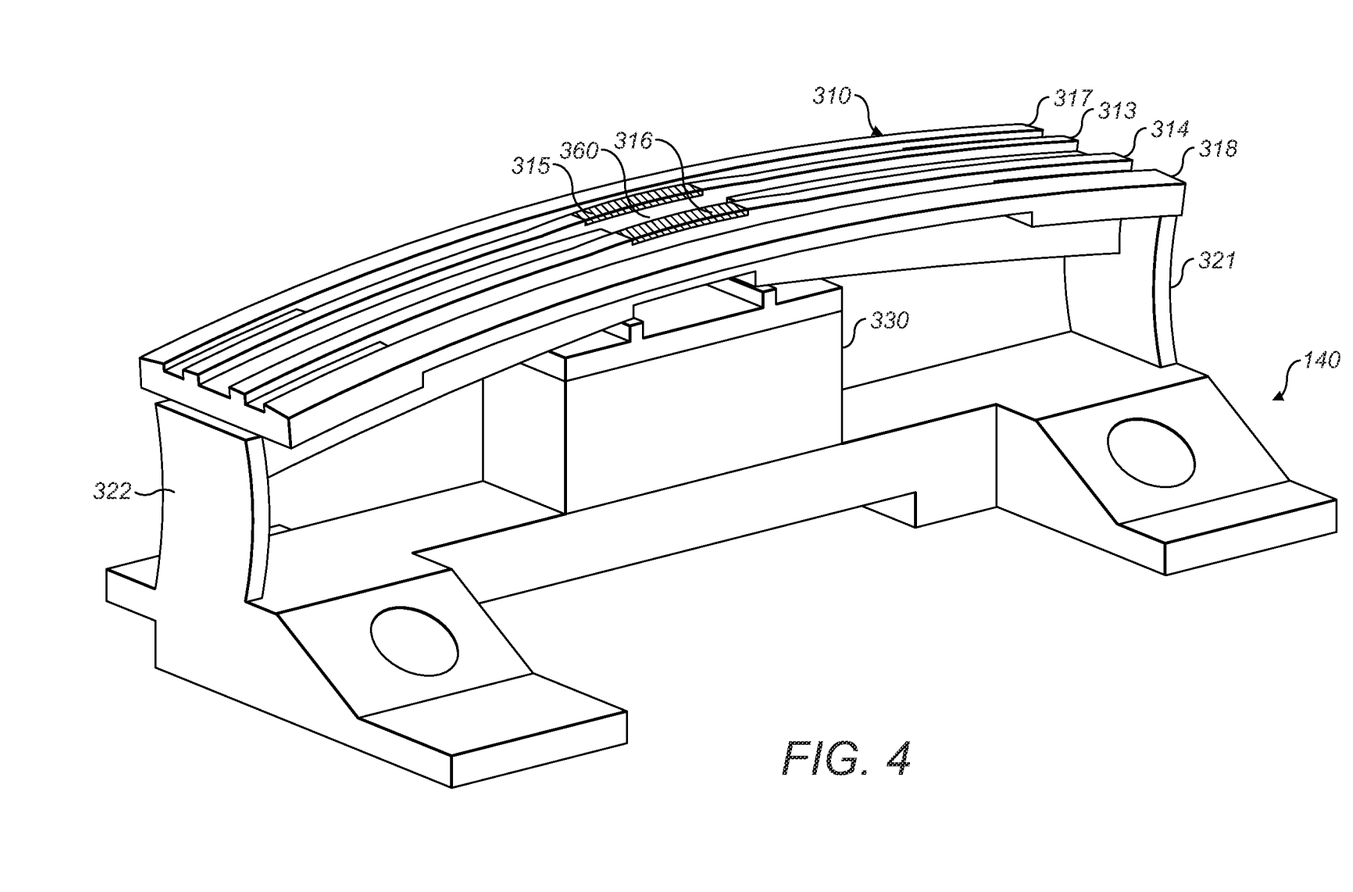
FIGS. 4 and 5 show the transducer head apparatus of FIG. 3 in bending.
Figure 5:
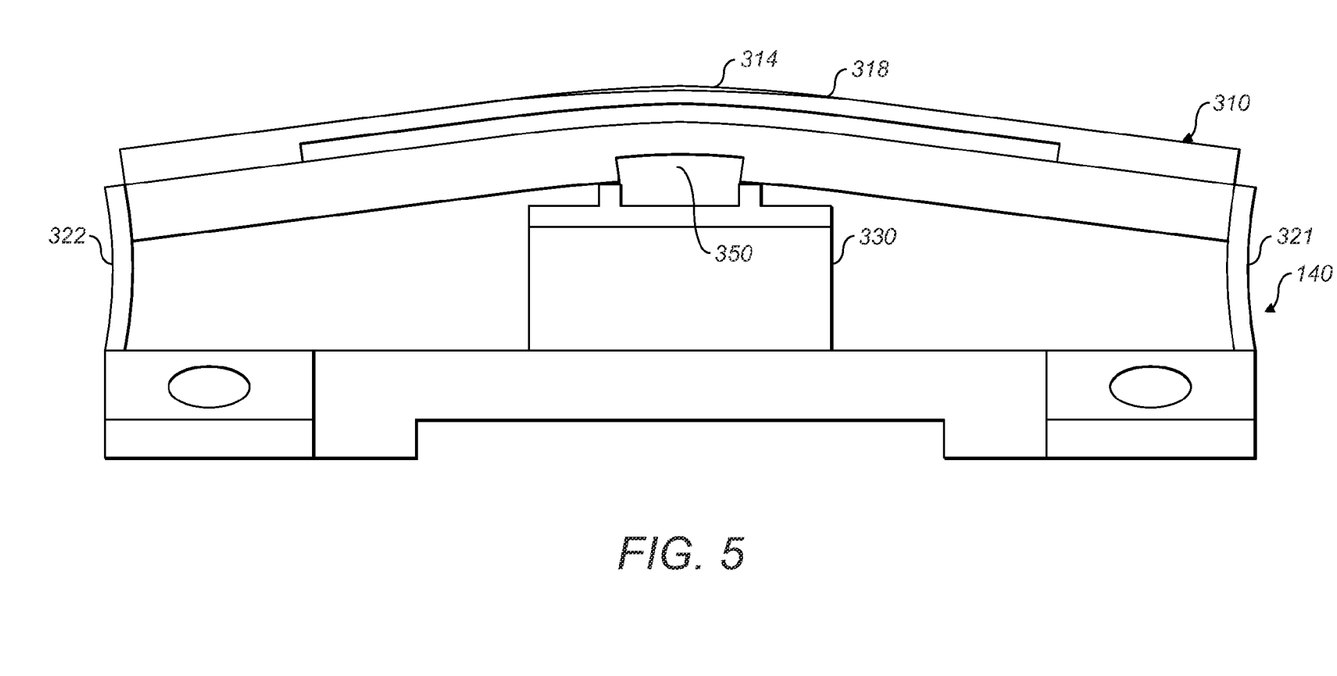

The body 310 is formed, for example, from a ceramic metallic composite material, or any other suitable material capable of resisting wear from a moving data carrier surface. The actuator 330 is operable to apply force to a rear-facing surface of the body 310 to cause the body 310 to bend, upwardly as shown in FIGS. 4 and 5, so as to cause longitudinal strain at the front of the body 310. The application of force in this manner increases the channel spacing of the transducer head apparatus 140 by increasing the interstitial longitudinal separation of transducer elements in the transducer element arrays 315, 316.

The actuator 330 of the present embodiment comprises a piezo device. However, in alternative embodiments other types of actuator for applying force in a front/back direction can be employed. For example, the actuator 330 could alternatively comprise a fluid operated piston, a voice coil, a shape memory alloy device, an element having high thermal expansion properties, a screw thread based actuator such as a lead screw, or any other suitable controllable force applier. Conveniently, the support 320 is relatively rigid to resist bending for maximising the bending of the body 310 under the force applied by the actuator 330.

Figure 6:
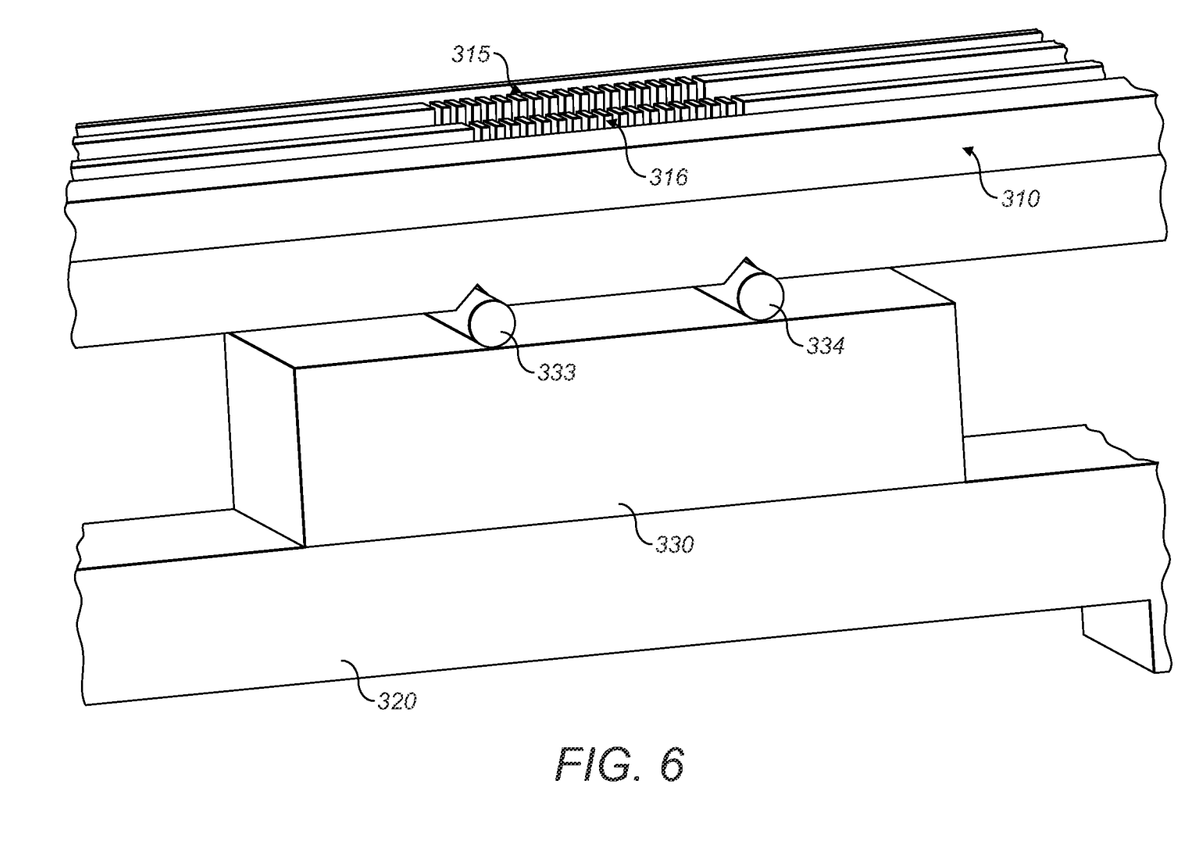
FIG. 6 shows an alternative arrangement for applying force at spaced longitudinal locations.

The actuator 330 is provided with two laterally extending, longitudinally spaced, protrusions 331, 332 on a front (upper in FIGS. 3 to 5) face thereof, for applying force to the body 310 in a front/rear direction in two longitudinally spaced locations on the body 310 between the opposite end portions supported by the mounts 321, 322. The protrusions 331, 332 in the embodiments of FIGS. 3 to 5 have a square or rectangular cross-section. In alternative embodiments, any other convenient form of force applier can be used. For example, in one alternative embodiment shown in FIG. 6, the force is applied using laterally extending rods 333, 334 of circular or rounded cross-section mounted to the front of the actuator 330, and laterally extending grooves or recesses 335, 336 are formed on a rear face of the body 310 for receiving the rods 333, 334.

Conveniently, the protrusions 331, 332 apply respective resultant forces at longitudinal locations on the body 310 that are outwith the outer longitudinal extent, or transducer element span, of the transducer elements. In the example of a 32 channel transducer head with a nominal channel pitch of approximately 100 µm, the transducer element span is approximately 3 mm, and the resultant forces are applied at longitudinal locations, for example, about 0.5 mm outwith the longitudinal extent of the transducer elements. The mounts 321, 322 in the present embodiment are provided by flexures, which flex during bending of the body 310 as best seen in FIGS. 4 and 5. This facilitates, for example, longitudinal movement of the body end portions caused by deformation of the body 310, mitigation of stress in opposite end portions of the body 310 and promotion of more uniform bending in the region of the transducer elements. The four point elastic bending arrangement described facilitates, for example, uniform bending (substantially constant bending moment) of the body 310 at least along the region of the transducer element arrays 315, 316. In one embodiment, the transducer head apparatus 140 is adjustable by the adjuster apparatus to generate at least about 300 microstrain (0.0003 µm/µm) longitudinally in the region (indicated generally by hatching in FIG. 3) of the transducer elements. Conveniently, the strain is substantially uniformly distributed, at least in the transducer element region.

In alternative embodiments (not shown), force is applied by the actuator 332 to the body 310 in a front/rear direction in a single longitudinal location between the end portion mounts 321, 322, for example in a longitudinally central region of the portion of the body 310 supporting the arrays 315, 316. This arrangement could in some circumstances facilitate sufficient adjustability of the transducer elements, particularly the longitudinally outermost transducer elements, with sufficiently uniform strain distribution in the transducer element region, while reducing the space necessary to accommodate the actuator 330 in the transducer head apparatus 140.

In alternative embodiments (not shown) further actuators are provided at respective longitudinal end portions of the body 310, for example between a rear surface of the body 310 and a front surface of the support 320. In use, the further actuators apply force to the respective longitudinal end portions of the body 310 in an opposite front/rear direction to the force applied to the body 310 by the actuator 330. This approach can in some circumstances facilitate, for example, a reduction in the size of the actuator 330 necessary to apply sufficient bending to the body 310, for easier accommodation of the actuator 330 within the transducer head apparatus 140. In further alternative embodiments (not shown), force can be applied at the body end regions to cause a resultant force by contact between the body and resistance members provided at one or more locations between the end regions, to bend the body. In still further alternative embodiments (not shown), deformation of the body could be caused by other means than actuator-applied bending force, for example by heating and/or cooling of the body to cause a desired longitudinal thermal expansion/contraction or other deformation.

In some embodiments, the body 310 is manufactured such that, with no force applied to the body 310, the transducer element channel spacing is less than a nominal channel spacing, so that the actuator 330 would be required to apply force as shown in FIGS. 4 and 5 to increase the channel spacing to nominal, as would be expected under normal operating conditions. A further increased force would be necessary to handle expanded data carriers. The force could be decreased to handle data carriers in contraction. Conversely, in other embodiments, the body 310 could be manufactured with greater than nominal channel spacing, and the body 310 would be bent in an opposite direction to achieve nominal channel spacing. This can facilitate, for example, better use of actuators that work more efficiently in one mode, such as expansion, than in another mode, such as contraction. A body 310 pre-manufactured with greater or lesser than nominal channel spacing can in some embodiments (not shown) be manufactured with a pre-bend, such that applying force to obtain nominal channel spacing reduces or eliminates the pre-bend.

The body 310 includes portions that provide weaker resistance to longitudinal stress, and facilitate relatively uniform longitudinal strain at the front of the body 310 during bending, at least in a region of the longitudinal extent of the transducer element arrays 315, 316. For example, as described in further detail below, at least one portion of the body 310 may have a reduced area of cross-section taken laterally across a longitudinal axis of the body 310. Additionally or alternatively, lateral incisions can be provided in the body.

As best shown in FIGS. 3, 4 and 5, a laterally extending slot or recess 350 is defined at a rear portion of the body 310. The recess 350 extends the entire lateral extent of a rear portion of the body 310, and extends longitudinally approximately coextensively with, or with somewhat greater extent than, the transducer element span of the transducer element arrays 315, 316. In one embodiment, for example, the transducer element span is approximately 3 mm, and the longitudinal extent of the recess 350 is approximately 3.5 mm. In the embodiment of FIGS. 3 to 4, force is applied by the protrusions 331, 332 at longitudinal locations immediately adjacent the longitudinally outer extent of the recess 350.

Figure 7:
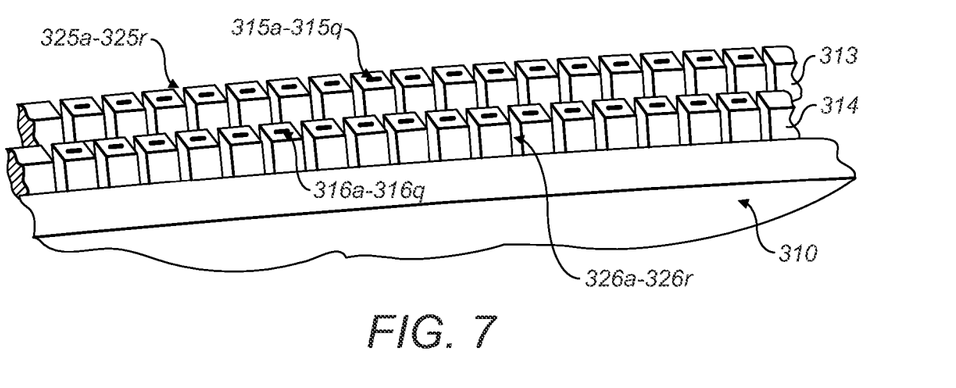
FIG. 7 illustrates lateral incisions in the transducer head apparatus between transducer elements.

As shown in FIG. 7, in some embodiments laterally extending incisions or slots 325a to 325r, 326a to 326r are provided in the rails 313, 314 in the region of the arrays 315, 316. At least some of the slots 325a to 325r, 326a to 326r are disposed between the transducer elements of the arrays 315, 316. The approximate longitudinal positions of the transducer elements of the arrays 315, 316, that is, of active parts of the transducer elements at or adjacent respective front surfaces of the rails 313, 314, are generally indicated in FIG. 7 by marks 315a to 315q, 316a to 316q. The slots may extend in the front/back direction for the height of the rail 313, 314, or any convenient alternative distance. This facilitates, for example more uniform bending of the body 310 in the region of the arrays 315, 316, and/or a reduction in the force necessary to effect a desired adjustment of the relative longitudinal dispositions of the transducer elements 315a to 315q, 316a to 316q. As best seen in FIGS. 3 and 4, the body 310 further defines a slot or recess 360 extending through the body in a front/back direction. The slot 360 extends laterally between the rails 315, 316, and extends longitudinally approximately coextensively with, or with somewhat greater extent than, the transducer element span of the transducer element arrays 315, 316. As seen, for example, in FIG. 5, in bending the portion of the inner rail 314 in a region of the array 316 has a greater and more uniform degree of curvature than the corresponding longitudinally coextensive portion of the outer rail 318.

At least some of the measures described above for weakening resistance to longitudinal stress can, particularly when used with favourable slot geometries, facilitate the mitigation of magnetostriction effects in the transducer element region due to stress-induced magnetic fields, and/or can facilitate a reduction in applied force necessary to effect a required amount of bending of the body 310.

The servo circuit 220 uses information read from the servo tracks 228, 229 by the servo transducer elements 260, 261 to determine the lateral position of the transducer head apparatus 140, and to align the transducer elements 240, 241, 242, 250, 251, 252, 255, 256, 257, 265, 266, 267 with respective data tracks 230, 231, 233. Under some operating circumstances, for example, extreme conditions of temperature and/or humidity, and/or varying manufacturing tolerances of different writing and reading data transfer devices, and/or using narrower data tracks or narrower read elements, it might not be possible to satisfactorily align all the transducer elements with their respective data tracks. For example, conditions of high humidity could cause expansion of the tape data carrier 120 thereby increasing the separation of the data tracks, whereby it is not possible to align the outer transducer elements with their respective data/servo tracks (the nearest the tape edge) at the same time as the inner transducer elements are aligned with their respective data/servo tracks.

The tape drive controller 221 further comprises an adjuster control circuit 222 (FIG. 2) operable to control the actuator 330 for adjusting the transducer head channel spacing. The servo control circuit is operable to use servo circuit track alignment information to determine whether it is possible to satisfactorily align all the transducer elements with their respective tracks. For example, signals from servo elements 260, 261 can be used to determine tape expansion using information from servo tracks 228, 229. In response to a determination that satisfactory alignment is not possible, or that predetermined thresholds have been met or exceeded, the tape drive controller 221 is operable to cause the adjuster control circuit 222 to control the actuator 330 to adjust the relative longitudinal dispositions of the head transducer elements, to facilitate that satisfactory alignment of all the transducer elements with their respective tracks is possible.

Figure 8:
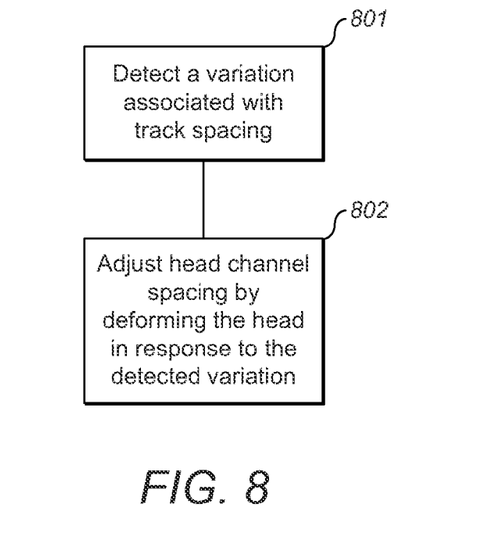
FIG. 8 illustrates a method comprising adjusting a transducer head channel spacing.

In use, the tape drive 110 detects variation associated with track spacing (801, FIG. 8) and adjusts the transducer head channel spacing, determined by the relative longitudinal positions at the front of the head body of transducer elements that concurrently read from and/or write a set of data tracks, by deformation of the transducer head in response to the detected variation (802, FIG. 8).

At least some of the above described embodiments facilitate alignment of transducer head elements with tracks on a data carrier that is subject to dimensional instability sufficiently significant to affect alignment, thereby facilitating the use of higher track density data carriers with narrower tracks and/or narrower transducer elements. The embodiments do not necessitate the use of more expensive data carriers designed to mitigate data carrier expansion and/or contraction effects. Transducer head apparatus according to at least some of the above described embodiments can be compatible with preceding data transfer formats, unlike some alternative solutions involving azimuthal rotation of the transducer head apparatus.

The controller 221 depicted in FIG. 2 can be implemented as hardware to perform various tasks discussed above. Alternatively, the controller 221 can be implemented as a combination of software and hardware to perform various tasks discussed above. For example, in the latter scenario, the controller 221 can include a processor that is able to execute software instructions to perform the tasks. The processor can include microprocessor, a microcontroller, a processor module or subsystem (including one or more microprocessors or microcontrollers), or other control or computing device. A "processor" can refer to a single component or to plural components. Instructions of the software can be stored in a storage device, which is implemented as one or more computer-readable or computer-usable storage media. The storage media includes different forms of memory including semiconductor memory devices such as dynamic or static random access memories, erasable and programmable read-only memories, electrically erasable and programmable read-only memories and flash memories; magnetic discs such as fixed, floppy and removable disks; other magnetic media including tape; and optical media such as compact discs or digital video discs. The instructions can be stored as drive firmware in flash memory within a tape storage device, for example.

The invention claimed is:

1. Transducer head apparatus for concurrently transferring data relative to a plurality of tracks on a data carrier, the head apparatus comprising: a body extending longitudinally, the body supporting a plurality of longitudinally spaced transducer elements; and adjuster apparatus to adjust the longitudinal dispositions of at least some of the transducer elements relative to other of the transducer elements, wherein the adjuster apparatus causes substantially uniform bending of the body along a longitudinal extent of the transducer elements.

2. The transducer head apparatus of claim 1, wherein the adjuster apparatus adjusts said relative longitudinal dispositions by at least one of: applying force to the body; bending the body; and otherwise deforming the body.

3. The transducer head apparatus of claim 1, further comprising a support, the body being mounted to the support, and the adjuster apparatus using the support in applying force to the body in a front/rear direction.

4. The transducer head apparatus of claim 1, wherein the adjuster apparatus applies force to the body in a front/rear direction in at least one longitudinal location between supported opposite end portions of the body.

5. The transducer head apparatus of claim 4, wherein the adjuster apparatus applies force to the body in a front/rear direction in at least two longitudinally spaced locations between supported opposite end portions of the body, the at least two locations being disposed longitudinally out with an outer longitudinal extent of the transducer elements.

6. The transducer head apparatus of claim 4, wherein the adjuster apparatus applies force to the body in a front/rear direction at the opposite end portions of the body, the force applied at the end portions being in an opposite direction to the force applied between said end portions.

7. The transducer head apparatus of claim 1, wherein the body is flexibly supported at opposite end portions thereof for permitting longitudinal movement of the end portions caused by deformation of the body.

8. The transducer head apparatus of claim 1, wherein at least one portion of the body along at least part of a longitudinal extent of the transducer elements has a reduced lateral cross-sectional area, and/or lateral incisions are provided in the body, for promoting longitudinal strain in a region of said longitudinal extent.

9. The transducer head apparatus of claim 1, wherein a laterally extending slot or recess is provided at a rear portion of the body extending longitudinally along at least part of a longitudinal extent of the transducer elements.

10. The transducer head apparatus of claim 1, wherein the body comprises at least one longitudinally extending rail supporting a respective array of said transducer elements, respective lateral incisions being provided in the at least one longitudinally extending rail between at least some of the transducer elements.

11. The transducer head apparatus of claim 1, wherein the body comprises at least two longitudinally extending rails supporting respective arrays of said transducer elements, a slot or recess extending laterally in a portion of the body between the rails and longitudinally along at least part of a longitudinal extent of the transducer elements.

12. The transducer head apparatus of claim 1, wherein the adjuster apparatus comprises at least one actuator for applying force to the body, the at least one actuator being selected from at least one of: a piezo device; a fluid operated piston; a voice coil; a shape memory alloy device; a high thermal expansion element with temperature adjuster; a MEMS device; a screw thread device.

13. Tape drive apparatus comprising the transducer head apparatus of claim 1 and a servo control circuit for controlling lateral alignment of the head apparatus with data tracks on a tape data carrier, the tape drive apparatus adjusting the dispositions of the head transducer elements relative to other of the head transducer elements in response to track alignment information from the servo control circuit.

14. In a data transfer device for concurrently transducing data relative to a plurality of data tracks, a method comprising detecting a variation associated with track spacing, and adjusting a transducer head channel spacing between head transducer elements by deforming the transducer head in response to the detected variation, wherein a laterally extending slot or recess is provided at a rear portion of a body extending longitudinally along at least part of a longitudinal extent of the head transducer elements.

15. The tape drive apparatus of claim 13, further comprising a laterally extending slot or recess provided at a rear portion of a body of the head apparatus extending longitudinally along at least part of a longitudinal extent of the head transducer elements.

16. The tape drive apparatus of claim 13, further comprising at least one longitudinally extending rail supporting a respective array of the head transducer elements, respective lateral incisions being provided in the at least one longitudinally extending rail between at least some of the head transducer elements.

17. In the data transfer device of claim 14, wherein a body comprises at least one longitudinally extending rail supporting a respective array of the head transducer elements, respective lateral incisions being provided in the at least one longitudinally extending rail between at least some of the head transducer elements.

18. In the data transfer device of claim 17, wherein the body comprises at least two longitudinally extending rails supporting respective arrays of the head transducer elements.

19. Transducer head apparatus for concurrently transferring data relative to a plurality of tracks on a data carrier, the head apparatus comprising: a body extending longitudinally, the body supporting a plurality of longitudinally spaced transducer elements; adjuster apparatus to adjust the longitudinal dispositions of at least some of the transducer elements relative to other of the transducer elements; and a support, the body being mounted to the support, and the adjuster apparatus using the support in applying force to the body in a front/rear direction.

20. Transducer head apparatus for concurrently transferring data relative to a plurality of tracks on a data carrier, the head apparatus comprising; a body extending longitudinally, the body supporting a plurality of longitudinally spaced transducer elements; and adjuster apparatus to adjust the longitudinal dispositions of at least some of the transducer elements relative to other of the transducer elements, wherein the adjuster apparatus applies force to the body in a front/rear direction in at least one longitudinal location between supported opposite end portions of the body.

* * * * *